United States Patent [19]

Pierce

[11] Patent Number: 4,572,340
[45] Date of Patent: Feb. 25, 1986

[54] SAFETY LOCK VEHICLE TRANSMISSION

[76] Inventor: Kenneth E. Pierce, 6577 Frank St., Mira Loma, Calif. 91752

[21] Appl. No.: 496,546

[22] Filed: May 20, 1983

[51] Int. Cl.[4] .................. B60K 41/26; F16D 41/24
[52] U.S. Cl. .................................. 192/4 C; 192/4 A
[58] Field of Search ............... 74/477; 192/4 A, 4 C, 192/114 R

[56] References Cited

U.S. PATENT DOCUMENTS

| Re. 28,039 | 6/1974 | Ruhl | 192/4 C X |
|---|---|---|---|
| 1,431,207 | 10/1922 | Alspaugh | 192/4 C X |
| 2,936,864 | 5/1960 | Schjolin et al. | 192/4 C |
| 3,132,729 | 5/1964 | Garland | 192/4 C |
| 3,135,367 | 6/1964 | Gregorich | 192/4 C |
| 3,169,616 | 2/1965 | Hunsaker et al. | 192/4 C |
| 3,437,184 | 4/1969 | Wilson | 192/4 C |
| 3,645,368 | 2/1972 | Blaauw | 192/4 C |
| 3,655,018 | 4/1972 | Higuchi et al. | 192/4 A |
| 3,702,648 | 11/1972 | Mori | 192/4 C |
| 4,349,089 | 9/1982 | Finney | 192/4 C X |

FOREIGN PATENT DOCUMENTS 1952000  5/1970  Fed. Rep. of Germany ...... 192/4 C

Primary Examiner—Leslie A. Braun
Assistant Examiner—Dirk Wright
Attorney, Agent, or Firm—Herbert E. Kidder

[57] ABSTRACT

A device to prevent the gears of an automotive vehicle from being shifted from forward, reverse or neutral to another position unless the brakes are firmly applied. The transmission includes a gear shift actuator that is rotatable between forward, neutral and reverse positions, and fixed to this actuator is a lever having an axially projecting fin on one side of the free end. Pivoted on a supporting frame is a steel bar having notches in one edge that are shaped and positioned to engage the fin on the lever whenever the lever is in any one of its three operating positions. A spring bears against the bar to urge the notched edge toward the fin of the lever, so that the bar normally engages and locks the lever. A hydraulic cylinder has its piston rod attached to the bar, and the cylinder is connected to the hydraulic braking system of the vehicle, so that when the brakes are applied, the cylinder acts to disengage the bar from the lever. Thus, the transmission can only be shifted into or out of gear while the brakes are applied.

4 Claims, 4 Drawing Figures

SAFETY LOCK VEHICLE TRANSMISSION

BACKGROUND OF THE INVENTION

The present invention pertains to a safety locking device for use with the gear shifting mechanism of an industrial truck, such as a fork lift, so that the transmission is locked against shifting gears until the vehicle's brakes are applied.

One of the characteristics of the typical fork lift vehicle is that the gears can be shifted from forward to reverse, or vice versa, while the vehicle is still in motion, and when the accelerator is depressed, the transmission and torque converter act as a brake, bringing the vehicle to an abrupt stop before moving in the opposite direction. The shock load on the transmission and torque converter, due to the sudden braking and reversing direction is extremely hard on the mechanism, and results in frequent, expensive repair jobs. The owners of the fork lifts are vexed by the constant expense of repairs and the inconvenience of down-time, while the fork lift is out of service, but the fork lift operators, who are primarily concerned with maneuvering their vehicles at top speed so as to get the work done, find it expedient and convenient to shift gears in the manner described. Thus, the fork lift owner finds it difficult to get the cooperation of the operators in driving the vehicles as they should be driven, i.e., by applying the brakes and bringing the vehicle to a stop before shifting gears.

Another problem with fork lift trucks is that they sometimes have a tendency to slip out of gear from low to neutral while running down a steep grade with a large load, using the engine drag to slow the vehicle and keep everything under control. When this happens, the fork lift loses the braking action of the engine and suddenly lurches downhill, completely out of control. The operator may be killed or injured when this happens, while the least-serious outcome may be a spilled load and a toppled fork lift.

Still another problem with fork lifts is that if one is left standing unattended with the gears in neutral while the engine is idling, vibration will sometimes cause the transmission to slip into gear, so that the vehicle starts moving off with no one at the controls. This can result in serious damage and/or injuries.

SUMMARY OF THE INVENTION

The primary object of the present invention is to provide an apparatus that overcomes the above-mentioned problems by automatically locking the transmission in any one of its selected positions (forward, neutral or reverse) so that it cannot be shifted unless the vehicle's brakes are being applied at the same time. Thus, the transmission cannot be shifted from forward to reverse until the brakes are applied to bring the vehicle to a stop; nor can the transmission slip from forward to neutral while the vehicle is running downhill, with engine drag being used to slow the vehicle. The transmission also cannot inadvertently slip into gear from neutral while standing still with the engine idling, as it is necessary for the operator to depress the brake pedal before that can happen.

The above object is achieved by providing a pair of cooperating members, one of which is integral with the gear shift actuator on the transmission housing and is rotatable therewith between forward, neutral and reverse positions as the gears are shifted. The other member is pivotally supported for angular movement between a spring-loaded locked position and a released position. The two members are provided with companionate formations which interlock when the said other member is in the locked position, thereby preventing the gear shift actuator from turning. A device, preferably in the form of a hydraulic cylinder, is connected to said other member and is actuated by the braking system of the vehicle, so that when the brakes are applied, the said other member is moved to the released position, allowing the gear shift actuator to turn freely to any other selected position.

The foregoing and other objects and advantages of the invention will become apparent to those skilled in the art from the following detailed description of the preferred embodiment thereof, which is illustrated in the drawings.

DESCRIPTION OF THE PREFERRED EMBODIMENT

Figure 1:
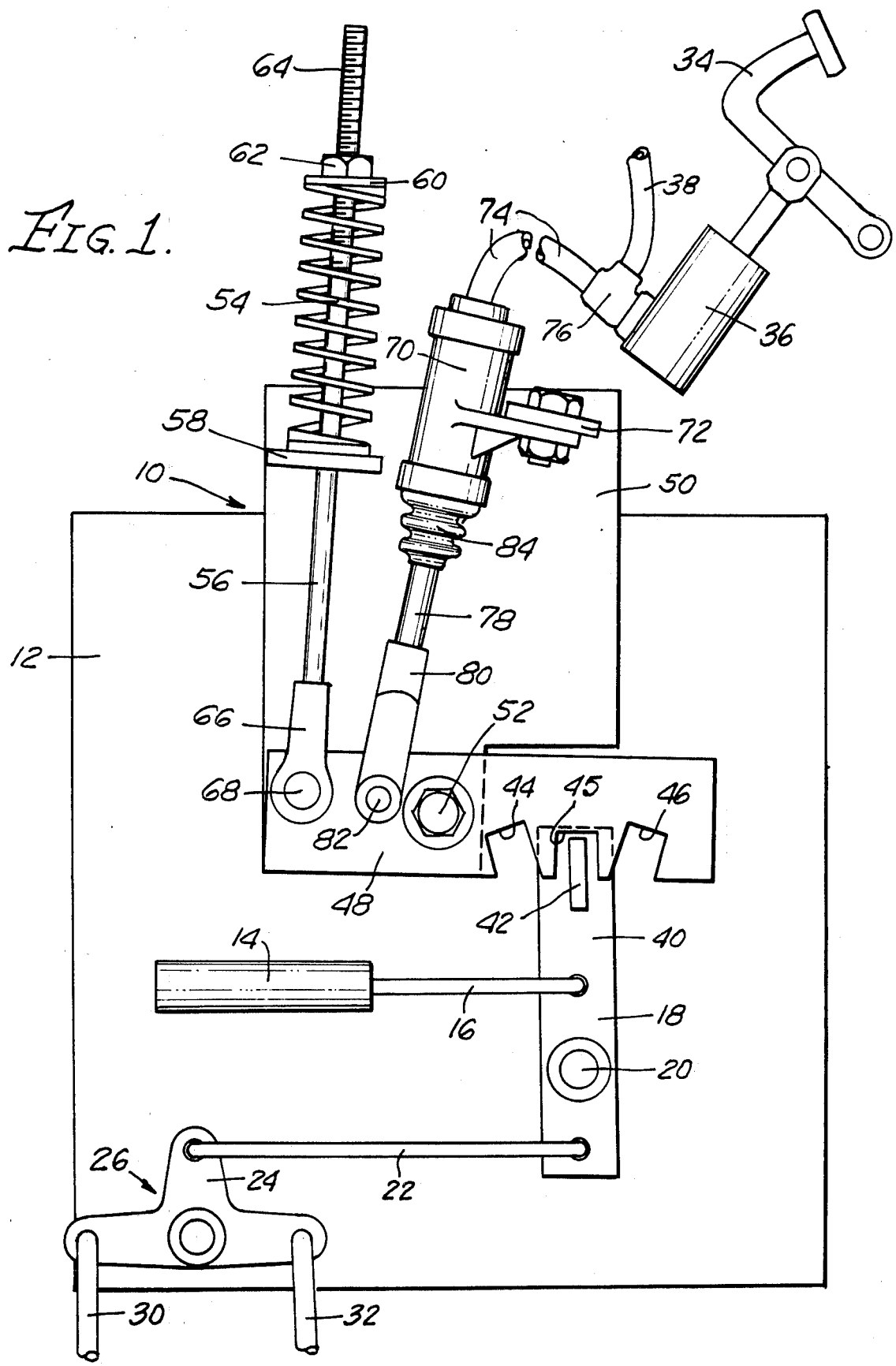
FIG. 1 is an elevational view of the invention mounted on the transmission housing of a fork lift truck or other industrial vehicle, with the vehicle's braking system shown more or less schematically, and the device being shown in the locked condition, with the gear shift actuator in neutral.

In the drawings, the reference numeral 10 designates the invention in its entirety, which is mounted on the transmission housing 12 of a fork lift truck. The transmission of the fork lift is typically of the hydraulically actuated type, wherein the forward, neutral and reverse conditions are controlled by a fluid valve 14, which is operated by a push rod 16 projecting from one end of the valve. The push rod 16 has its free end connected to a member 18 that is pivotally supported for rotation about a pivot bolt 20 projecting from the transmission housing 12, and member 18 is connected on the side opposite pivot bolt 20 to another push rod 22 extending back toward the left, as seen in FIG. 1. The left-hand end of push rod 22 is connected to the upstanding arm 24 of a T-shaped member 26, which is pivoted on a pivot bolt 28, and the other two, oppositely extending arms are connected to forwardly extending pushrods 30 and 32. The push rods 30, 32 are connected at their front ends to two side-by-side pedals (not shown), one of which shifts the gears to forward drive, while the other shifts to reverse drive. When the forward drive pedal is depressed, member 26 is rotated in one direction, and when the reverse drive pedal is depressed, member 26 is rotated in the opposite direction. Member 18, being connected by link 22 to member 26, is caused to rotate with the latter, but in the opposite direction.

The mechanism described to this point is the conventional transmission housing, gear-shifting valve, actuating member 18, and connecting linkages of a typical fork lift truck. While details may vary from model to model, all fork lift trucks, to the best of my knowledge, have a member, such as member 18, that is movable between forward, neutral and reverse positions, to control the drive transmission of the vehicle. Member 18 will hereinafter be referred to, both in the specification and in the appended claims, as a "gear shift actuator", although it is realized that it would be technically more correct to designate the hydraulic valve 14 and push rod 16 as the gear shift actuator.

One remaining item that is essential to the present invention, and that is also standard equipment on all fork lift trucks, is the hydraulic braking system, herein represented schematically by a brake pedal 34 connected to a master brake cylinder 36. The brake cylinder 36 is connected by hose 38 to the several wheel brake cylinders (not shown), so that when the brake pedal 34 is depressed, fluid pressure within the master brake cylinder 36 is transmitted to the wheel brake cylinders to brake the vehicle.

The apparatus of the invention includes a first member 40 that is fixed to the gear shift actuator 18, forming an extension of one end thereof. Member 40 may be in the form of a piece of bar stock welded onto member 18, or it may be produced as an integral part of member 18 at the time the latter is manufactured. Fixed to the top surface of member 40 and projecting upwardly therefrom is a fin 42, which is engageable by one or another of three notches 44, 45 and 46 formed in the bottom edge of a second member 48.

Figure 2:
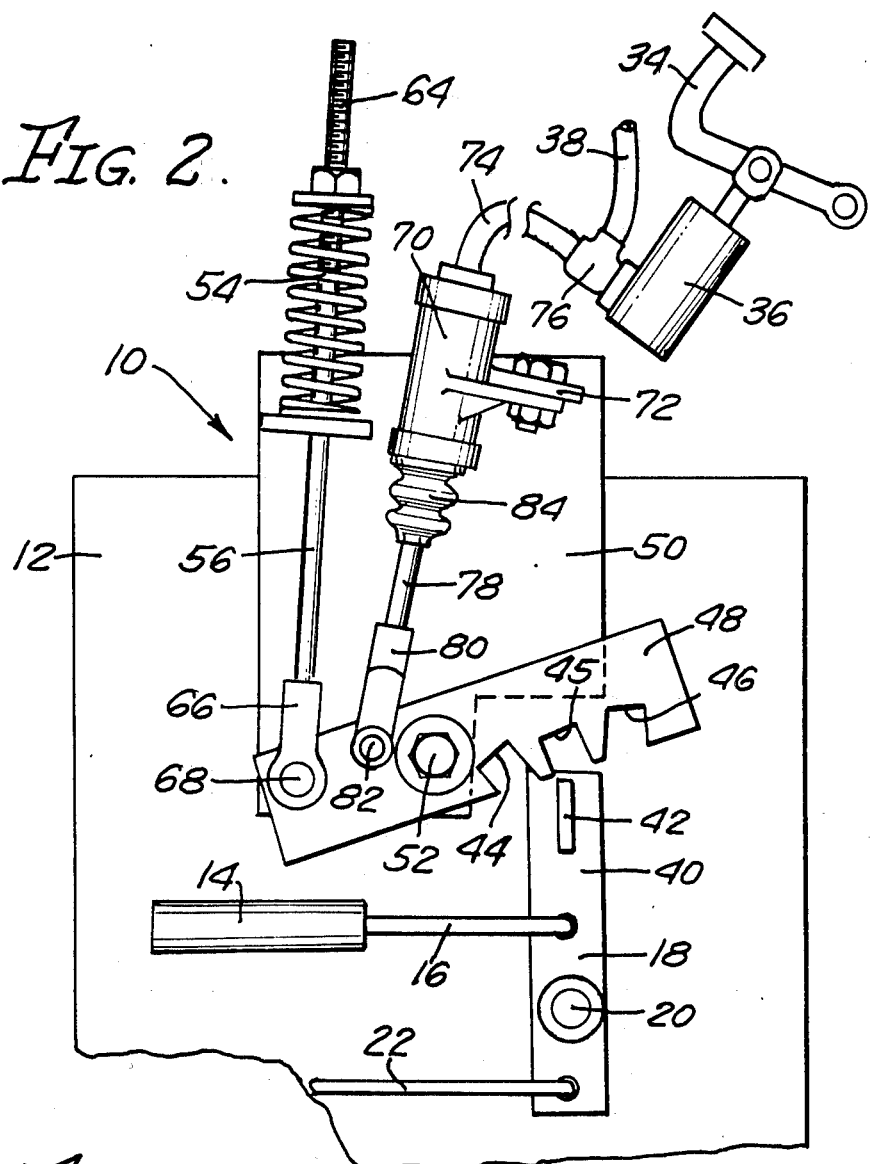
FIG. 2 is a similar view of the same, drawn to a somewhat smaller scale, showing the device in the released condition, as when the brakes are applied.

The major portion of the apparatus of the invention is supported on a mounting plate 50, which is attached in any suitable manner to the transmission housing 12. A pivot bolt 52 is fixed to the surface of plate 50 near the bottom edge thereof, and the said second member 48 is pivoted on the bolt for angular movement between the locked position shown in FIGS. 1, 3 and 4, in which one of the notches 44, 45 and 46 engages the fin 42, and the released position shown in FIG. 2, wherein the notches are raised clear of the fin. Notches 44, 45 and 46 are angled, as shown in the drawings, so that they extend radially from the pivot 20 when the member 48 is in the locked position. The notches are also enlarged somewhat, so as to facilitate engagement with the fin 42 as member 48 turns on its pivot 52.

Member 48 is resiliently urged in the direction to cause notches 44, 45 and 46 to close against fin 42, by means comprising a compression spring 54 and spring rod 56. The bottom end of spring 54 is seated on a shelf 58 that is fixed to plate 50 and projects outwardly therefrom. The top end of spring 54 bears against a washer 60 that is backed up by a nut 62 screwed onto the threaded end 64 of spring rod 56. Spring rod 56 passes through a hole in shelf 58, and on its bottom end is a fork 66 that straddles the end of member 48 on the side of pivot 52 opposite the notches 44, 45 and 46. Fork 66 is connected to member 48 by a pin 68.

Figure 3:
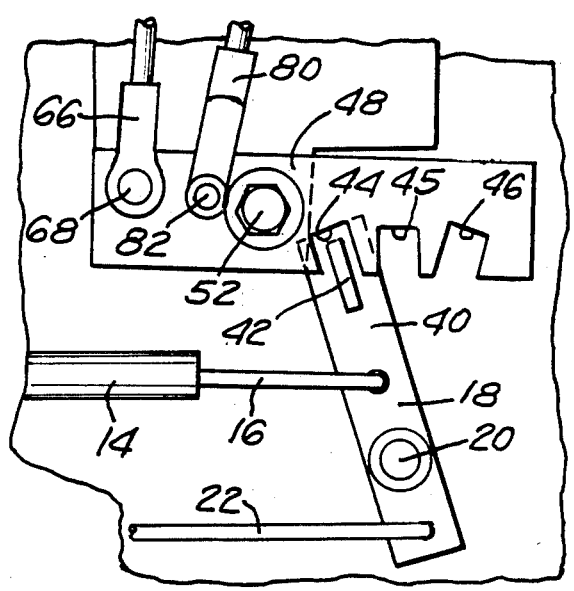
FIG. 3 is a fragmentary view, showing the transmission locked in reverse drive.
Figure 4:
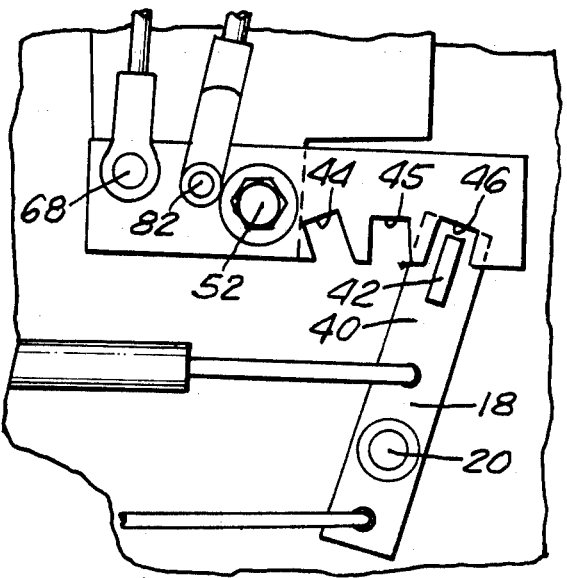
FIG. 4 is another fragmentary view, showing the transmission locked in forward drive.

With the apparatus in the locked condition, as shown in FIGS. 1, 3 and 4, the gear shift actuator 18 is engaged by member 48 and cannot be turned to either of its other two positions. However, the present invention provides means whereby the gear shift actuator 18 can be released and the transmission shifted to another condition by merely applying the brakes at the same time. To this end, a hydraulic cylinder 70 is mounted on a shelf 72 projecting from the plate 50, and is connected by hose 74 and Tee-connection 76 to the master brake cylinder 36. Thus, hydraulic pressure created in brake cylinder 36 is transmitted to cylinder 70, as well as to the wheel brake cylinders, and this causes the piston rod 78 to be extended. At the bottom end of the piston rod 78 is a fork 80 that straddles the top edge of member 48 and is connected thereto by a pin 82. A rubber boot 84 encloses and protects the upper portion of piston rod 78 where it emerges from the bottom end of the cylinder.

The nut 62 on spring rod 56 has another function other than its obvious function of connecting the top end of the spring to the rod, and that is to provide means for adjusting the amount of brake pressure required to release member 48 from member 18. By turning the nut 62 down toward the spring 54, the upward pressure exerted by the spring 54 on the left-hand end of member 48 is substantially increased, making it necessary to apply the brakes with considerable force before the hydraulic cylinder 70 is able to overcome the spring pressure and release member 48 from member 18. Under conditions where it is necessary to apply some braking control while running downhill, it is desirable that the operator be able to apply a certain amount of braking effort without unlocking member 18, and this is accomplished by adjusting the nut 62 so that the spring pressure provides the desired amount of braking effort before the gear shift actuator is released.

The operation of the invention is believed to be evident from the foregoing description. However, to summarize, the member 48 is normally spring-pressed into engagement with member 18, with the fin 42 confined within one or another of notches 44, 45, 46, as shown in FIGS. 1, 3 and 4. In this condition, the gear shift actuator 18 cannot be moved, and the transmission cannot be shifted from forward to reverse, or vice versa; nor can the transmission slip into forward or reverse drive from neutral while the vehicle is standing still with its engine idling. The only way that the transmission can be shifted from one of its positions (forward, reverse, or neutral) into another is by simultaneously applying the brakes hard enough to stop the vehicle, which then causes the hydraulic cylinder 70 to release member 48 from member 18.

While I have shown and described in considerable detail what I believe to be the preferred form of the invention, it will be understood by those skilled in the art that the invention is not limited to such details, but might take various other forms within the scope of the claims. For example, the fork lift's brakes might be electric, or air-powered, in which case the hydraulic cylinder 70 would be replaced by a solenoid, or air cylinder. Another contemplated variation is that the gear shift actuator 18 might be a linearly movable member, in which case the locking member 48 would be correspondingly changed. The essence of the invention is that a device is provided which locks the transmission against being shifted unless the vehicle's brakes are simultaneously applied. It is the application of the vehicle's brakes that releases the gear shift actuator.

What I claim is:

1. For use with an industrial vehicle having a transmission with a gear shift actuator that is rotatable between forward, neutral and reverse positions, and a braking system; the improvement comprising a safety locking device consisting of:

a lever fixed to the gear shift actuator and rotatable therewith, said lever having a first locking formation provided thereon;

a member pivoted for rocking movement between a first position and a second position, said member having a second locking formation provided thereon which is operable when the member is in said first position to engage said first locking formation on said lever when the latter is in any one of its three positions, and when the member is in said second position to disengage and release said first locking formation;

means yieldingly urging said member to said first position; and other means responsive to actuation of the vehicle's braking system to move said member from said first position to said second position against the resistance of said first-named means, whereby the gear shift actuator is released and can be rotated from one of its positions to another only while the braking system is being actuated.

2. The device as set forth in claim 1, wherein said first-named means comprises a spring acting against said member in the direction to urge said second locking formations into engagement with the companionate said first locking formations on said lever.

3. The device as set forth in claim 2, which additionally includes means for varying the spring pressure exerted by said spring against said member, whereby the spring pressure can be adjusted so that the force required to overcome the spring pressure and disengage said member from said lever is great enough to allow for partial actuation of the braking system without releasing said gear shift actuator.

4. The device as set forth in claim 2, wherein the braking system of the vehicle is hydraulic; and said other means comprises a hydraulic cylinder which is connected to the hydraulic braking system of the vehicle, whereby hydraulic pressure caused by actuation of the vehicle's braking system causes said hydraulic cylinder to retract said member from engagement with said lever.

* * * * *